(12) United States Patent
Yong et al.

(10) Patent No.: US 9,929,681 B2
(45) Date of Patent: Mar. 27, 2018

(54) MULTI-FUNCTIONAL ECM MOTORS FOR HVAC SYSTEMS

(71) Applicant: Zhongshan Broad-Ocean Motor Co., Ltd., Zhongshan (CN)

(72) Inventors: Zhao Yong, Zhongshan (CN); Chen Yunshen, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 0 days.

(21) Appl. No.: 14/411,961

(22) PCT Filed: Feb. 20, 2014

(86) PCT No.: PCT/CN2014/072290
§ 371 (c)(1),
(2) Date: Dec. 30, 2014

(87) PCT Pub. No.: WO2015/123833
PCT Pub. Date: Aug. 27, 2015

(65) Prior Publication Data
US 2016/0373035 A1    Dec. 22, 2016

(51) Int. Cl.
*H02P 1/04* (2006.01)
*H02P 6/16* (2016.01)
(Continued)

(52) U.S. Cl.
CPC .............. *H02P 6/16* (2013.01); *H02K 11/28* (2016.01); *H02K 11/33* (2016.01); *H02P 27/06* (2013.01); *H02P 6/14* (2013.01)

(58) Field of Classification Search
CPC ........ H02P 6/182; H02P 6/085; Y02B 30/741; F25B 49/025; F25B 2600/02
See application file for complete search history.

(56) References Cited

U.S. PATENT DOCUMENTS 8,143,828 B2   3/2012  Becerra et al.
8,362,725 B2   1/2013  Becerra et al.
(Continued)

FOREIGN PATENT DOCUMENTS

CN         101764551 A      6/2010
CN         202634345 U     12/2012
(Continued)

*Primary Examiner* — Shawki S Ismail
*Assistant Examiner* — Zoheb Imtiaz
(74) *Attorney, Agent, or Firm* — Norton Rose Fulbright US LLP (57) ABSTRACT

Systems and methods associated with an HVAC system and a multi-functional ECM motor for use in the HVAC system are disclosed. The motor controller of the ECM motor includes a microprocessor, a tap detection circuit and a power source portion. The tap detection circuit is coupled to several tap input lines. The motor also includes first and second AC input wires, a common wire, a ground wire, a first jumper wire and a second jumper wire. Each tap input line is coupled to the first input terminal of one current sensing unit. The first jumper wire is coupled to the second AC input wire, and the second jumper wire is coupled to the common wire. By coupling different wires of the ECM motor differently when replacing a PSC motor than when replacing ECM motors, the ECM motor is configured to replace PSC motors and ECM motors in HVAC systems.

11 Claims, 10 Drawing Sheets

(51) Int. Cl.
*H02K 11/28* (2016.01)
*H02K 11/33* (2016.01)
*H02P 27/06* (2006.01)
*H02P 6/14* (2016.01)

(56) References Cited

U.S. PATENT DOCUMENTS

| | | |
|---|---|---|
| 9,231,505 B2 | 1/2016 | Lu et al. |
| 9,276,514 B2 | 3/2016 | Zhao |
| 9,306,479 B2 | 4/2016 | Chen et al. |
| 2010/0033119 A1* | 2/2010 | Becerra ............... F24F 11/006 318/400.09 |
| 2010/0060215 A1* | 3/2010 | Woodward ............ H02P 1/16 318/400.09 |
| 2011/0181216 A1* | 7/2011 | Bass ..................... H02P 6/28 318/400.11 |
| 2011/0254477 A1* | 10/2011 | Woodward ............ F23N 3/082 318/400.3 |

FOREIGN PATENT DOCUMENTS

| | | |
|---|---|---|
| CN | 202841046 U | 3/2013 |
| CN | 202889281 U | 4/2013 |
| CN | 103309251 A | 9/2013 |
| CN | 103338005 A | 10/2013 |
| EA | 1521357 A3 | 6/2009 |

\* cited by examiner

MULTI-FUNCTIONAL ECM MOTORS FOR HVAC SYSTEMS

CROSS-REFERENCE TO RELATED APPLICATIONS

This application is a national stage filing of PCT/CN2014/072290 filed Feb. 20, 2014, which is hereby incorporated by reference.

TECHNICAL FIELD

The present disclosure relates to an HVAC system and a multi-functional ECM motor for use in the HVAC system.

BACKGROUND

As competition in the field of electric appliances has become increasingly fierce over recent years, more demanding technical requirements are being posed on products. For example, products are now required to be energy saving and environmentally friendly, and have a high degree of controllable intelligence, a short development period, and low noise. Electric motors, as the core part, have undoubtedly become a key part to solving the above-mentioned technical problems. Motors in conventional household central air conditioners are typically single phase permanent-split capacitor AC motors (PSC). However, single phase AC motors have low efficiency, consume more energy, have high noise, and have a low degree of controllable intelligence.

As a result of advances in motor technologies, permanent magnet (PM) synchronous motors have been developed. PM synchronous motors typically have a motor controller to electronically commutate current. As a result, PM synchronous motors are also referred to as electronically commutated (ECM) motors. PM synchronous motors are characterized in that they are energy saving and environmentally friendly, they have relatively high reliability and controllability, generate low noise, are easily made more intelligent, and can address the drawbacks of single phase AC motors. Therefore, the single phase AC motors in conventional household central air conditioners are gradually being replaced by PM synchronous motors. However, circuit ports are quite different for single phase AC motors and PM synchronous motors, which creates a problem because it is difficult for one motor to have two different circuit ports. When a conventional PM synchronous motor is used to replace the single phase AC motor in an existing household central air conditioner, it is necessary to replace the circuit port of the motor, change the motor circuit, etc., making the replacement inconvenient and costly.

In view of the foregoing drawbacks, ECM motors have been developed to directly replace the original PSC motors without the need to change the circuit structure of the original application systems of the PSC motors, e.g., the HVAC control system. The installation and troubleshooting of ECM motors in HVAC systems is simple, and the development cost associated with an ECM motor is lower than that of a PSC motor.

However, current ECM motors used to replace single phase AC motors still have numerous problems, a few of which are listed next.

1) The ECM motors have a single function and cannot be used for different applications. For example, they cannot be used to replace ECM motors currently on the market to detect AC input tap signals. As a specific example, an X13 motor has tap input signals at 24 VAC, while tap input signals for the current ECM motors that replace the PSC motors are 115 VAC or 230 VAC, therefore the two are not compatible. In addition, operational parameters for power source voltage, turning, and reprogramming cannot be directly configured for the current ECM motors that replace the PSC motors, and it is relatively inconvenient to configure the settings. As a result, more models must be developed, disorganized products are made, and management and costs are increased.

2) Low reliability; because different applications have different requirements for the ECM motors, it is easy for errors or accidents to take place when the ECM control is unable to adapt to different applications.

3) In conventional systems, a current transformer and relevant circuits are used to detect the state of all tap input lines. However, because the transformer has a large volume and high cost, the transformer takes up a large space of the motor controller, which causes the motor controller to have poor heat dissipation.

4) A plurality of current transformer sensing units are embedded into the wiring plug of the motor, which makes installation difficult, production efficiency low, and large scale production difficult. The aforementioned drawbacks of current ECM motors are not intended to be an all-inclusive list, as numerous other drawbacks exist.

SUMMARY

There is a need to develop a solution to expand the application range of existing ECM motors for HVAC systems to avoid repeated development, lower the R&D cost, shorten R&D period, and facilitate management. An object of the present disclosure is to provide a multi-functional ECM motor that has a simple structure and that can conveniently replace PSC motors and ECM motors on the market that use AC inputs as tap signals. The replacement may be simple, the wiring may be convenient, and the cost may be low. Moreover, the ECM motor disclosed herein may integrate a variety of circuits, may be applicable for different applications, may have high operational reliability, and may save time and cost of management and development.

Another object of the present disclosure is to provide an HVAC system that may use the ECM motor of the present disclosure to replace a PSC motor or an ECM motor that uses AC inputs as tap signals. The installation may be simple, the wiring may be convenient, the original HVAC system structure may not need to be changed, the retrofitting cost may be low, the application range may be wide, and the electric efficiency may be higher.

The present disclosure achieves the above objects through the technical solutions described herein. One embodiment includes a multi-functional ECM motor comprising a motor and a motor controller. The motor controller may include a control box and a control circuit board installed in the control box. In some embodiments, the control circuit board may be integrated with a microprocessor, an inverter circuit, a tap detection circuit and a power source portion thereon. The power source portion may be connected to an external AC power source input, and the output terminal of the power source portion may supply power to all circuits. The tap detection circuit may be connected to several tap input lines, and, according to some embodiments, only one tap input line may be selected to be in the on state, and the remaining lines may be selected to be in the off state without electricity. The tap detection circuit may include several current sensing units, and each tap input line may be connected to an input terminal of a current sensing unit. The output terminal of the current sensing unit may be connected to the input terminal of the microprocessor, and the microprocessor may select an operational parameter for the motor based on the detected on state signal of each tap input line. In some embodiments, the microprocessor may control the motor to run according to the selected operational parameter, characterized in that the current sensing unit compatibly detects 24 V low-voltage AC signals and 115 V or 230 V high-voltage AC signals of the several tap input lines.

According to an embodiment, the motor controller may also include a first AC input wire, a second AC input wire, a common wire, a ground wire, a first jumper wire and a second jumper wire. The first jumper wire may be connected with the second AC input wire, the second jumper wire may be connected with the common wire. The second input terminals of the current sensing units may be connected in parallel and then connected with the common wire and the second jumper wire, respectively. The above several tap input lines may refer to 5 tap input lines (N1, N2, N3, N4 and N5).

In one embodiment, when a PSC motor used by a corresponding commercial equipment system is to be replaced, the multi-functional ECM motor may connect a total of 7 wires, which may include the 5 tap input lines, the first AC input wire, and the ground wire, to the equipment system. The first jumper wire and the second jumper wire may be shorted with a socket connector, one of the 5 tap input lines may be for a 115 V or 230 V high-voltage AC to pass through, one of the 5 tap input lines and the first AC input wire may act as the AC power input and may be connected in parallel into the power source portion, and the second AC input wire and the common wire may be suspended without connection.

In another embodiment, when an ECM motor used by a corresponding commercial equipment system is to be replaced, the multi-functional ECM motor may connect a total of 9 wires, which may include the 5 tap input lines, the first AC input wire, the ground wire, the second AC input wire, and the common wire, to the equipment system. The first jumper wire and the second jumper wire may be disconnected, the first AC input wire and the second AC input wires may act as the external AC power input and may be connected in parallel into the power source portion. One of the 5 tap input lines (N1, N2, N3, N4 and N5) may be for a 24 V low-voltage AC to pass through and may pair with the common wire to form a loop.

In some embodiments, the microprocessor may be further connected with a serial communication unit, and the microprocessor may establish an external communication connection via the serial communication unit and may form a serial communication port. The power source portion may include a voltage multiplication and conversion device, and by connecting or breaking the voltage multiplication and conversion device at the power source setting port with a connector, the voltage multiplication and conversion device may be in an operating state of one time or two times of the voltage. In one embodiment, the microprocessor may be further connected with a turning setting circuit, and by connecting or breaking the turning setting circuit at the turn setting port with a connector, the turning setting circuit ma send a control signal to the microprocessor, and the microprocessor may control the forward or backward rotation of the motor through the inverter circuit.

In some embodiments, a wiring sheath may be installed on the control box. A total of 9 wires, which may include the 5 tap input lines, the first AC input wire, the ground wire, the second AC input wire, and the common wire, may be guided out from the wiring sheath. A jumper wire box may be installed on the wiring sheath. According to an embodiment, a serial communication port, a power source setting port, a turn setting port, and a motor type selection port may be installed in the jumper wire box. A connector may be installed at the serial communication port, the power source setting port, the turn setting port, and the motor type selection port, respectively. The connector of the motor type selection port may be electrically connected with the first jumper wire and the second jumper wire, respectively. The first jumper wire and the second jumper wire may be electrically connected or disconnected by installing or unplugging a connector at the motor type selection port. According to an embodiment, the output terminal of the above tap detection circuit may be connected with the microprocessor via a filter circuit.

According to an embodiment, an HVAC system may include a THERMOSTAT and an HVAC system controller that originally controls a PSC motor, and the THERMOSTAT may input control signals to the HVAC system controller. In some embodiments, the multi-functional ECM motor may be used to directly replace the original PSC motor. According to some embodiments, a multi-functional ECM motor may include a motor and a motor controller. The motor controller may include a control box and a control circuit board installed in the control box. In some embodiments, the control circuit board may be integrated with a microprocessor, an inverter circuit, a tap detection circuit and a power source portion thereon. The power source portion may be connected to an external AC power source input, and the output terminal of the power source portion may supply power to all circuits. The tap detection circuit may be connected to several tap input lines, and, according to some embodiments, only one tap input line may be selected to be in the on state, and the remaining lines may be selected to be in the off state without electricity. The tap detection circuit may include several current sensing units, and each tap input line may be connected to an input terminal of a current sensing unit. The output terminal of the current sensing unit may be connected to the input terminal of the microprocessor, and the microprocessor may select an operational parameter for the motor based on the detected on state signal of each tap input line. In some embodiments, the microprocessor may control the motor to run according to the selected operational parameter, characterized in that the current sensing unit compatibly detects 24 V low-voltage AC signals and 115 V or 230 V high-voltage AC signals of the several tap input lines.

The motor controller may include a first AC input wire (N), a second AC input wire (L), a common wire (COM), a ground wire (E), a first jumper wire (L1) and a second jumper wire (L2). The first jumper wire (L1) may be connected with the second AC input wire (L), and the second jumper wire (L2) may be connected with the common wire (COM). The second input terminals of the current sensing units may be connected in parallel and then connected with the common wire (COM) and the second jumper wire (L2), respectively. According to an embodiment, a total of 7 wires, which may include the several tap input lines, the first AC input wire and the ground wire may be connected to the HVAC system controller. The first jumper wire and the second jumper wire may be shorted with a socket connector. One of the 5 tap input lines may be for a 115 V or 230 V high-voltage AC to pass through. One of the 5 tap input lines and the first AC input wire may act as the AC power input and may be connected in parallel into the power source portion. In some embodiments, the second AC input wire and the common wire may be suspended without connection.

According to some embodiments, the microprocessor may be further connected with a serial communication unit. The microprocessor may establish an external communication connection via the serial communication unit and may form a serial communication port. The power source portion may include a voltage multiplication and conversion device, and by connecting or breaking the voltage multiplication and conversion device at the power source setting port with a connector, the voltage multiplication and conversion device may be in an operating state of one time or two times of the voltage. The microprocessor may be further connected with a turning setting circuit, and by connecting or breaking the turning setting circuit at the turn setting port with a connector, the turning setting circuit may send a control signal to the microprocessor, and the microprocessor may control the forward or backward rotation of the motor through the inverter circuit.

The above several tap input lines may refer to 5 tap input lines (N1, N2, N3, N4 and N5). In some embodiments, a wiring sheath may be installed on the control box. A total of 9 wires, which may include the 5 tap input lines, the first AC input wire, the ground wire, the second AC input wire, and the common wire, may be guided out from the wiring sheath. A jumper wire box may be installed on the wiring sheath. According to an embodiment, a serial communication port, a power source setting port, a turn setting port, and a motor type selection port may be installed in the jumper wire box. A connector may be installed at the serial communication port, the power source setting port, the turn setting port, and the motor type selection port, respectively. The connector of the motor type selection port may be electrically connected with the first jumper wire and the second jumper wire, respectively. The first jumper wire and the second jumper wire may be electrically connected or disconnected by installing or unplugging a connector at the motor type selection port.

According to an embodiment, an HVAC system may include a THERMOSTAT and an HVAC system controller that originally controls a ECM motor, and the THERMOSTAT may input control signals to the HVAC system controller. In some embodiments, the multi-functional ECM motor may be used to directly replace the original ECM motor. According to some embodiments, a multi-functional ECM motor may include a motor and a motor controller. The motor controller may include a control box and a control circuit board installed in the control box. In some embodiments, the control circuit board may be integrated with a microprocessor, an inverter circuit, a tap detection circuit and a power source portion thereon. The power source portion may be connected to an external AC power source input, and the output terminal of the power source portion may supply power to all circuits. The tap detection circuit may be connected to several tap input lines, and, according to some embodiments, only one tap input line may be selected to be in the on state, and the remaining lines may be selected to be in the off state without electricity. The tap detection circuit may include several current sensing units, and each tap input line may be connected to an input terminal of a current sensing unit. The output terminal of the current sensing unit may be connected to the input terminal of the microprocessor, and the microprocessor may select an operational parameter for the motor based on the detected on state signal of each tap input line. In some embodiments, the microprocessor may control the motor to run according to the selected operational parameter, characterized in that the current sensing unit compatibly detects 24 V low-voltage AC signals and 115 V or 230 V high-voltage AC signals of the several tap input lines.

The motor controller further comprises a first AC input wire (N), a second AC input wire (L), a common wire (COM), a ground wire (E), a first jumper wire (L1) and a second jumper wire (L2). The first jumper wire (L1) may be connected with the second AC input wire (L), and the second jumper wire (L2) may be connected with the common wire (COM). The second input terminals of the current sensing units may be connected in parallel and then connected with the common wire (COM) and the second jumper wire (L2), respectively. A total of 9 wires, which may include the 5 tap input lines, the first AC input wire, the ground wire, the second AC input wire, and the common wire may be connected to the HVAC system controller. The first jumper wire and the second jumper wire may be disconnected. The first AC input wire and the second AC input wire may act as the external AC power input and may be connected in parallel into the power source portion. One of the several tap input may be for a 24 V low-voltage AC to pass through and pairs with the common wire (COM) to form a loop.

According to some embodiments, the microprocessor may be further connected with a serial communication unit. The microprocessor may establish an external communication connection via the serial communication unit and may form a serial communication port. The power source portion may include a voltage multiplication and conversion device, and by connecting or breaking the voltage multiplication and conversion device at the power source setting port with a connector, the voltage multiplication and conversion device may be in an operating state of one time or two times of the voltage. The microprocessor may be further connected with a turning setting circuit, and by connecting or breaking the turning setting circuit at the turn setting port with a connector, the turning setting circuit may send a control signal to the microprocessor, and the microprocessor may control the forward or backward rotation of the motor through the inverter circuit.

The above several tap input lines may refer to 5 tap input lines (N1, N2, N3, N4 and N5). In some embodiments, a wiring sheath may be installed on the control box. A total of 9 wires, which may include the 5 tap input lines, the first AC input wire, the ground wire, the second AC input wire, and the common wire, may be guided out from the wiring sheath. A jumper wire box may be installed on the wiring sheath. According to an embodiment, a serial communication port, a power source setting port, a turn setting port, and a motor type selection port may be installed in the jumper wire box. A connector may be installed at the serial communication port, the power source setting port, the turn setting port, and the motor type selection port, respectively. The connector of the motor type selection port may be electrically connected with the first jumper wire and the second jumper wire, respectively. The first jumper wire and the second jumper wire may be electrically connected or disconnected by installing or unplugging a connector at the motor type selection port.

Compared to the prior art, embodiments disclosed herein may have significant effects, a few of which are listed next.

1) In some embodiments, when a PSC motor used by a corresponding commercial equipment system is to be replaced, embodiments disclosed herein may connect a total of 7 wires, which may include the several tap input lines, the first AC input wire (N), and the ground wire (E), to the equipment system. The first jumper wire (L1) and the second jumper wire (L2) may be shorted with a socket connector, and the second AC input wire (L) and the common wire (COM) may be suspended without connection. When an ECM motor used by a corresponding commercial equipment system is to be replaced, it may connect a total of 9 wires, which may include the several tap input lines, the first AC input wire (N), the ground wire (E), the second AC input wire (L) and the common wire (COM), to the equipment system. The first jumper wire (L1) and the second jumper wire (L2) may be disconnected, and the common wire (COM) may detect signals and may output the same to the equipment system. As a result, the ECM motor may have a simple structure, which can conveniently replace PSC motors and ECM motors on the market that use AC inputs as tap signals. The replacement may be simple, the wiring may be convenient, and the cost may be low. Moreover, the ECM motor disclosed herein may integrate a variety of circuits, may be applicable for different applications, may have high operational reliability, and may save time and cost of management and development. One unit may have multiple functions, leading to high performance/price ratio.

2) According to some embodiments, the motor controller may integrate the serial communication unit, the turning setting circuit and the voltage multiplication and conversion device such that the ECM motor may be applicable for different applications/workplaces, and have high operational reliability and extensive application range.

3) According to an embodiment, the output terminal of the tap detection circuit may be connected with the microprocessor via a filter circuit, which can effectively reduce current fluctuation at the output terminal of the tap detection circuit, and improve the accuracy and reliability of the detection by the microprocessor.

4) In some embodiments, a wiring sheath may be installed on the control box. A total of 9 wires, which may include the 5 tap input lines, the first AC input wire, the ground wire, the second AC input wire, and the common wire, may be guided out from the wiring sheath. A jumper wire box may be installed on the wiring sheath. According to an embodiment, a serial communication port, a power source setting port, a turn setting port, and a motor type selection port may be installed in the jumper wire box. A connector may be installed at the serial communication port, the power source setting port, the turn setting port, and the motor type selection port, respectively. The connector of the motor type selection port may be electrically connected with the first jumper wire and the second jumper wire, respectively. The first jumper wire and the second jumper wire may be electrically connected or disconnected by installing or unplugging a connector at the motor type selection port. The structure may be simple and a connector may be used to achieve function selections of a motor, which may make the use intuitive and convenient, as well as highly reliable.

5) According to some embodiments, the HVAC system may have a simple structure. The HVAC system may use the ECM motor of the present utility model to replace a PSC motor or an ECM motor that uses AC inputs as tap signals. The installation may be simple, the wiring may be convenient, the original HVAC system structure may not need to be changed, the retrofitting cost may be low, the application range may be wide, and the electric efficiency may be higher.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

FIG. 11 is a block diagram of the circuit in Example 3 according to one embodiment of the disclosure.

DETAILED DESCRIPTION OF THE INVENTION

Example 1

According to some embodiments, as shown in FIGS. 1-4, a multi-function ECM motor may include a motor 1 and a motor controller 2. According to an embodiment, the motor controller 2 may include a control box 21 and a control circuit board 22 installed in the control box 21. The control circuit board 22 may be integrated with a microprocessor, an inverter circuit, a tap detection circuit, and a power source portion. The power source portion may be connected to an external AC power source input, and the output terminal of the power source portion may supply power to all circuits. The rotor position detection circuit may detect the rotor position signal of the motor through a HALL element and may send the signal to the microprocessor. The microprocessor may control the motor to run through the inverter circuit.

Figure 1:
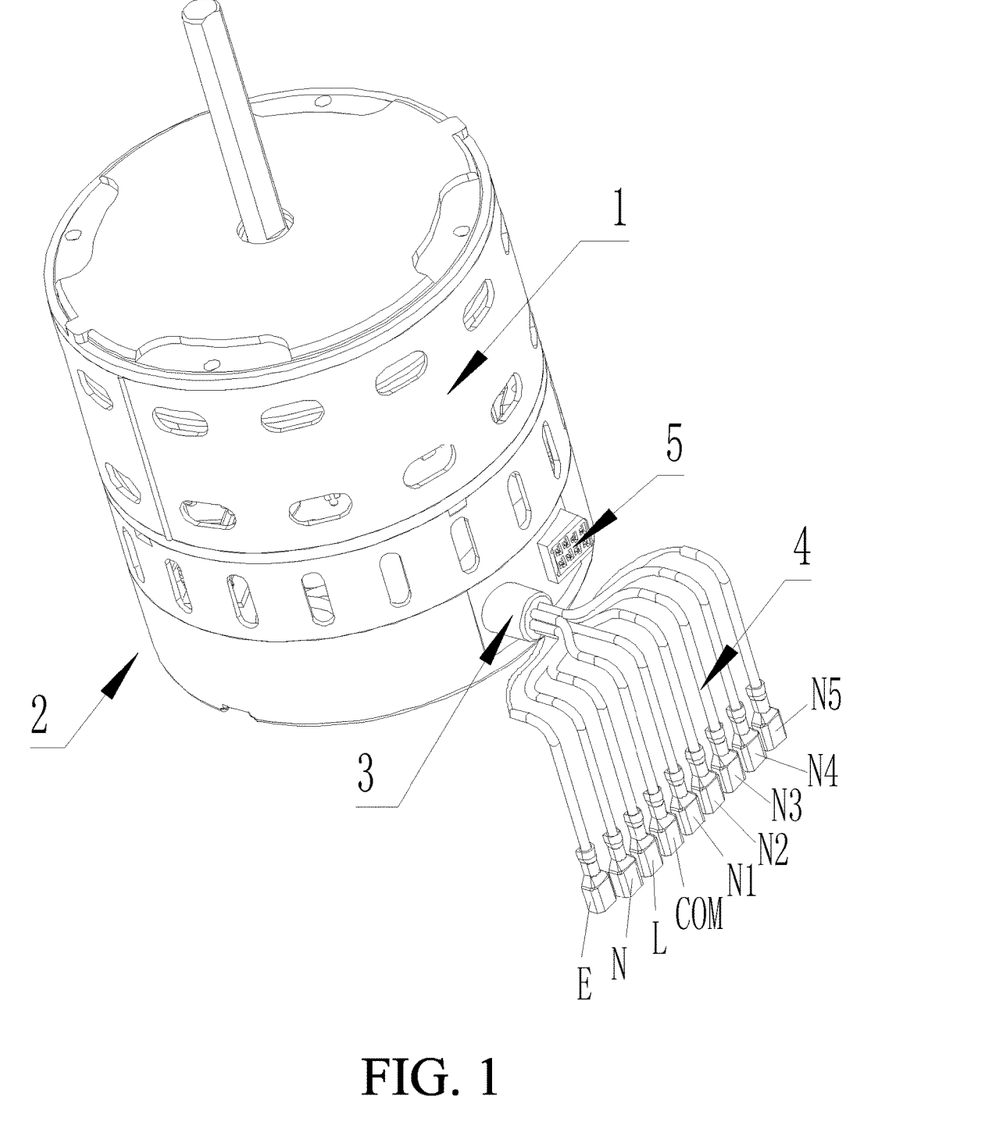
FIG. 1 is a schematic block diagram illustrating a three-dimensional view of the ECM motor according to one embodiment of the disclosure.
Figure 2:
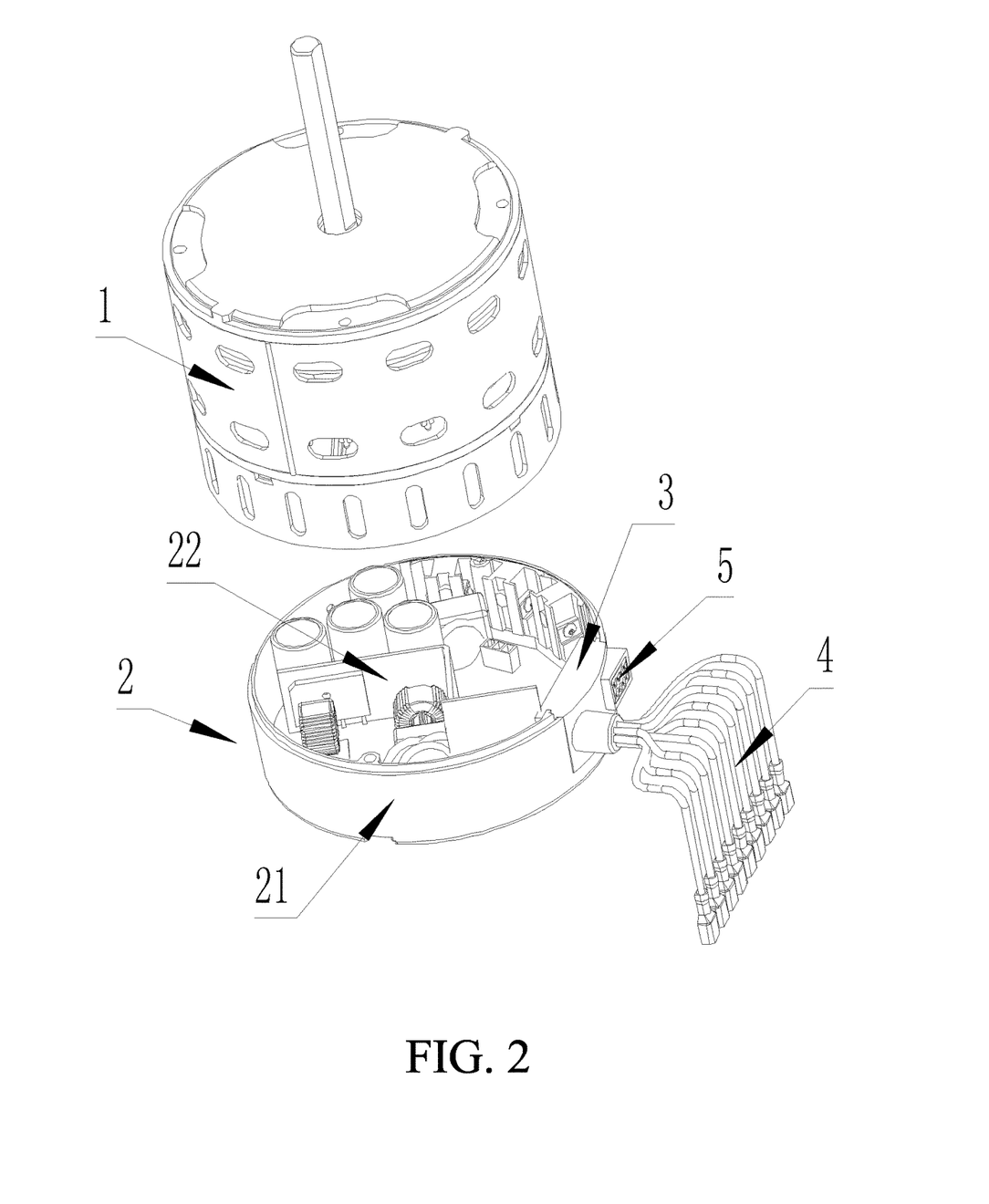
FIG. 2 is schematic block diagram illustrating an exploded view of the ECM motor according to one embodiment of the disclosure.
Figure 3:
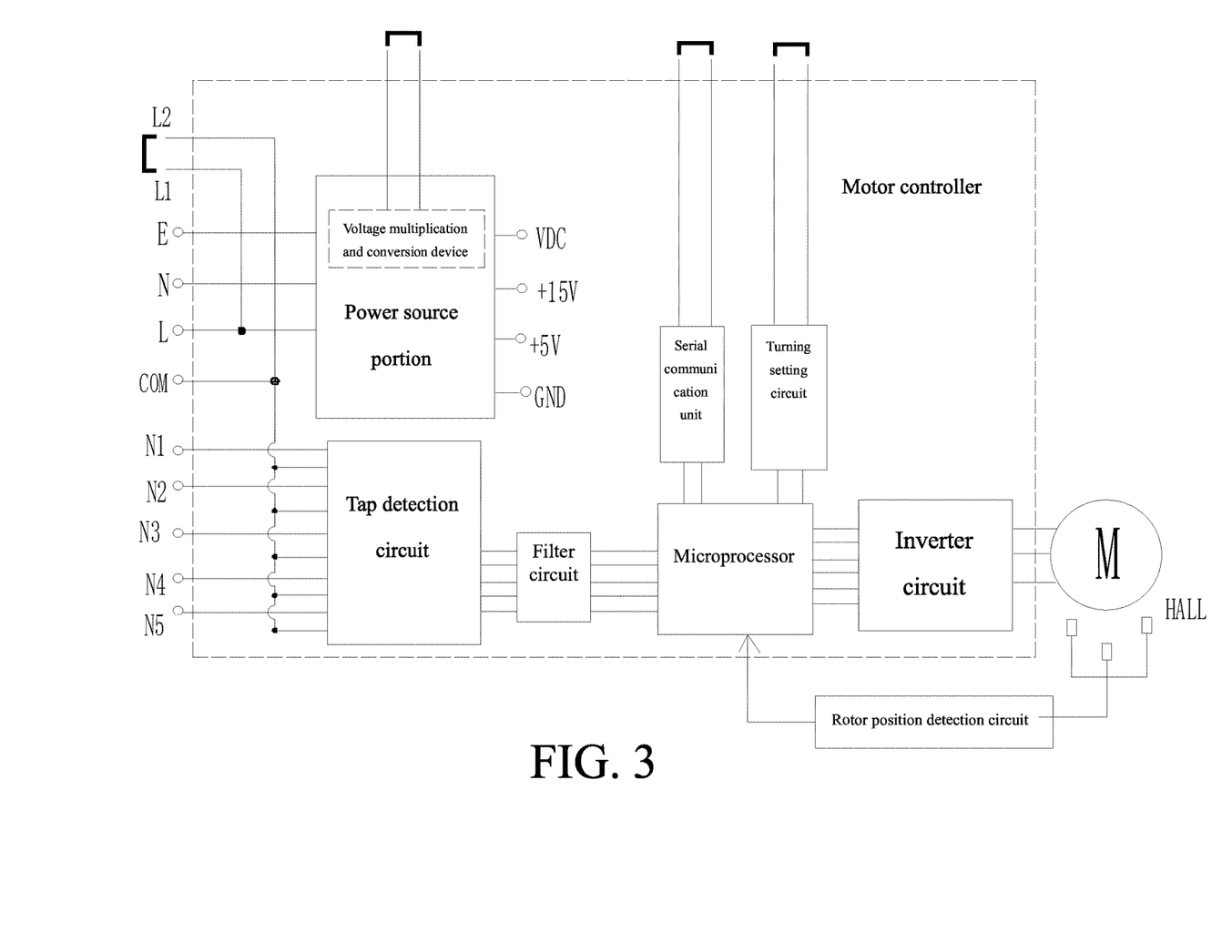
FIG. 3 is a schematic block diagram illustrating a circuit according to one embodiment of the disclosure.
Figure 4:
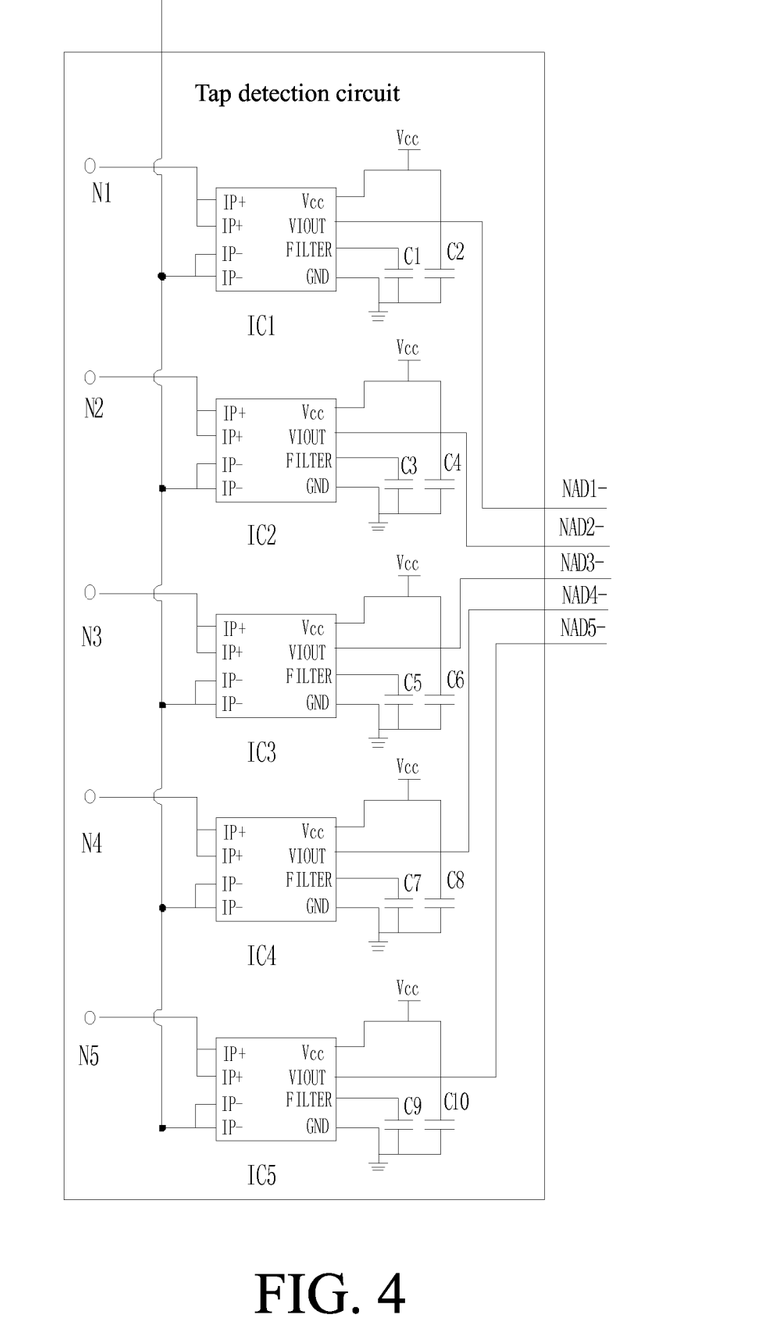
FIG. 4 is a schematic block diagram illustrating a detailed circuit diagram of the tap detection circuit according to one embodiment of the disclosure.

In some embodiments, the tap detection circuit may be connected to 5 tap input lines (N1, N2, N3, N4 and N5), wherein only one tap input line may be selected to be in the on state, and the remaining lines may be selected to be in the off state without electricity. The tap detection circuit may further include a first AC input wire N, a second AC input wire L, a common wire COM, a ground wire E, a first jumper wire L1 and a second jumper wire L2. The tap detection circuit may include several current sensing units. In one embodiment, each tap input line may be connected to an input terminal of a current sensing unit. The first jumper wire L1 may be connected with the second AC input wire L, and the second jumper wire L2 may be connected with the common wire COM. The second input terminals of the current sensing units may be connected in parallel and then connected with the common wire COM and the second jumper wire L2, respectively. The output terminal of the current sensing unit may be connected to the input terminal of the microprocessor, and the microprocessor may select an operational parameter for the motor based on the detected on state signal of each tap input line and may control the motor to run according to the selected operational parameter. In one embodiment, the current sensing unit may be a HALL current sensor chip that is commercially available. Several tap input lines can be 5 tap input lines (N1, N2, N3, N4 and N5), or just 3 tap input lines (N1, N2 and N3).

According to an embodiment, when a PSC motor used by a corresponding commercial equipment system is to be replaced, a total of 7 wires, which may include the 5 tap input lines (N1, N2, N3, N4 and N5), the first AC input wire N, and the ground wire E, may be connected to the equipment system. The first jumper wire L1 and the second jumper wire L2 may be shorted with a socket connector. One of the 5 tap input lines (N1, N2, N3, N4 and N5) may be for a 115 V or 230 V high-voltage AC to pass through, one of the 5 tap input lines (N1, N2, N3, N4 and N5) and the first AC input wire N may act as the AC power input and may be connected in parallel into the power source portion, and the second AC input wire L and the common wire COM may be suspended without connection.

In another embodiment, when an ECM motor used by a corresponding commercial equipment system is to be replaced, a total of 9 wires, which may include the 5 tap input lines (N1, N2, N3, N4 and N5), the first AC input wire N, the ground wire E, the second AC input wire L and the common wire COM, are connected to the equipment system. The first jumper wire L1 and the second jumper wire L2 may be disconnected. The first AC input wire N and the second AC input wire L may act as the external AC power input and may be connected in parallel into the power source portion, one of the 5 tap input lines (N1, N2, N3, N4 and N5) may be for a 24 V low-voltage AC to pass through, and the common wire COM may detect signals and may output the same to the equipment system, namely COM outputs 24 V AC.

Figure 5:
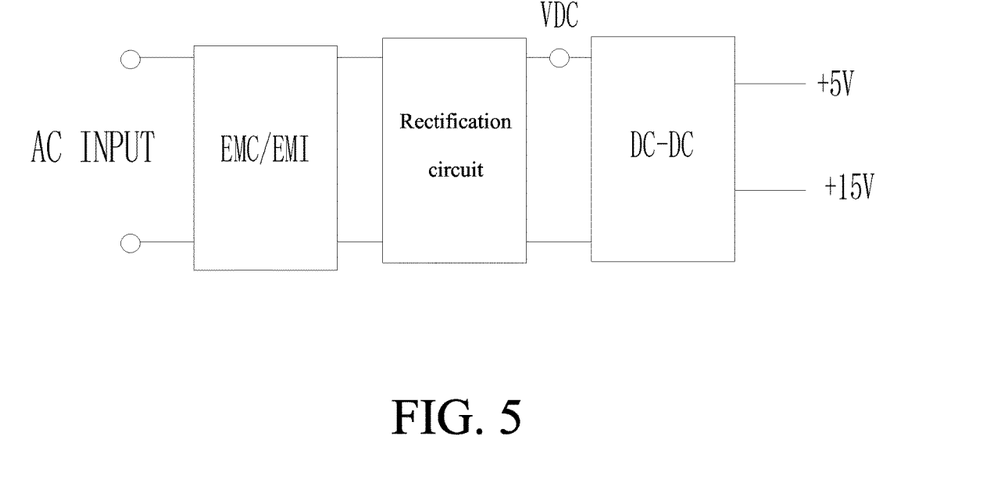
FIG. 5 is a schematic block diagram of the power source portion according to one embodiment of the disclosure.
Figure 6:
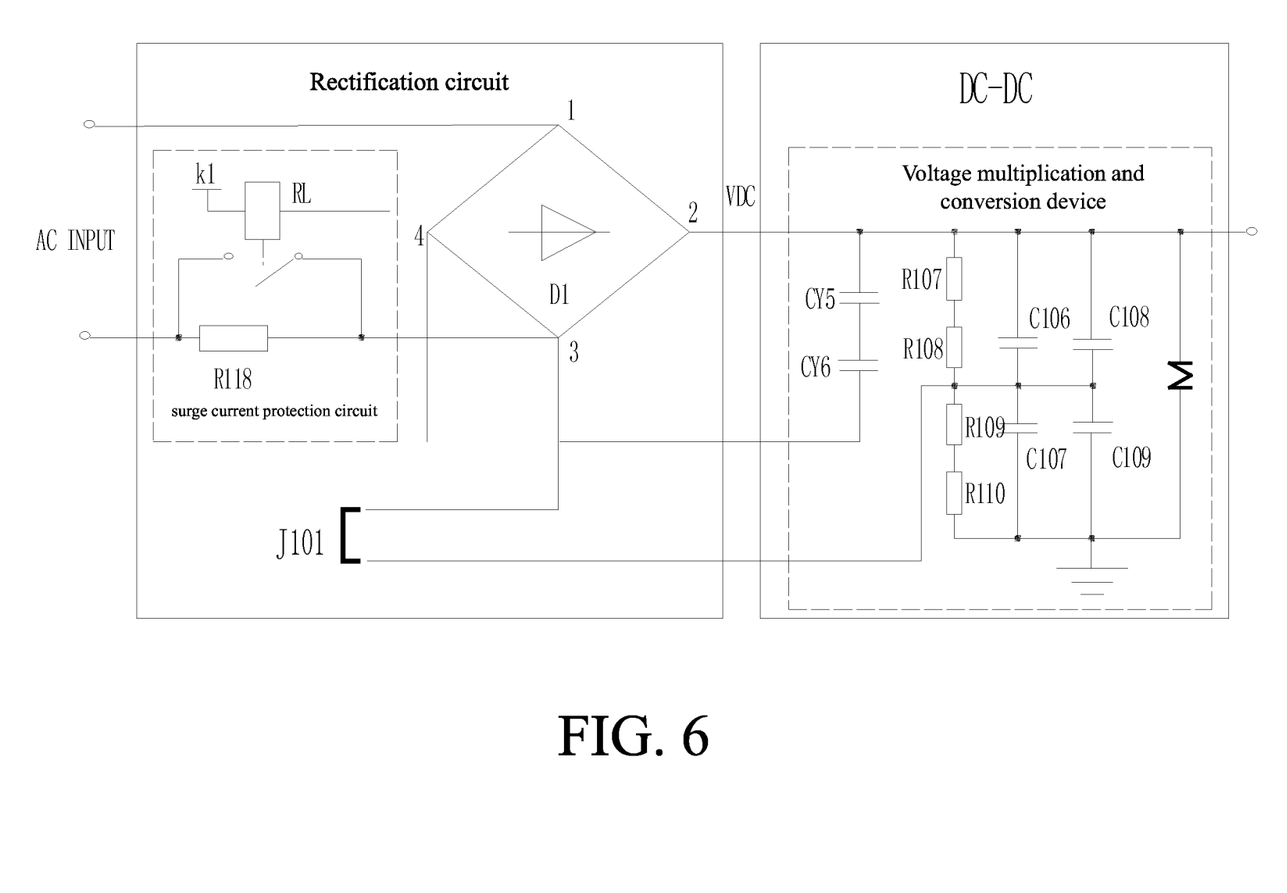
FIG. 6 is a detailed circuit diagram of the rectification circuit and the DC-DC converter circuit according to one embodiment of the disclosure.

As shown in FIG. 5 and FIG. 6, the power source portion may include an EMI or EMC anti-electromagnetic interference circuit, a rectification circuit and a DC-DC converter circuit. The input terminal of the EMI or EMC anti-electromagnetic interference circuit may be connected to AC input, and the output terminal of the EMI or EMC anti-electromagnetic interference circuit may be connected to the input terminal of the rectification circuit. The rectification circuit may output the bus voltage VDC and may be connected to the DC-DC converter circuit. The DC-DC converter circuit may output bus +15 V, +5 V, bus voltage VDC, +15 V, +5 V, and may supply power to all circuits. The rectification circuit may include a surge current protection circuit. The DC-DC converter circuit may include a voltage multiplication and conversion device, and by connecting or breaking the voltage multiplication and conversion device at the power source setting port with a connector J101, the voltage multiplication and conversion device may be in an operating state of one time or two times of the voltage, namely converting between 115 VAC and 230 VAC.

Figure 7:
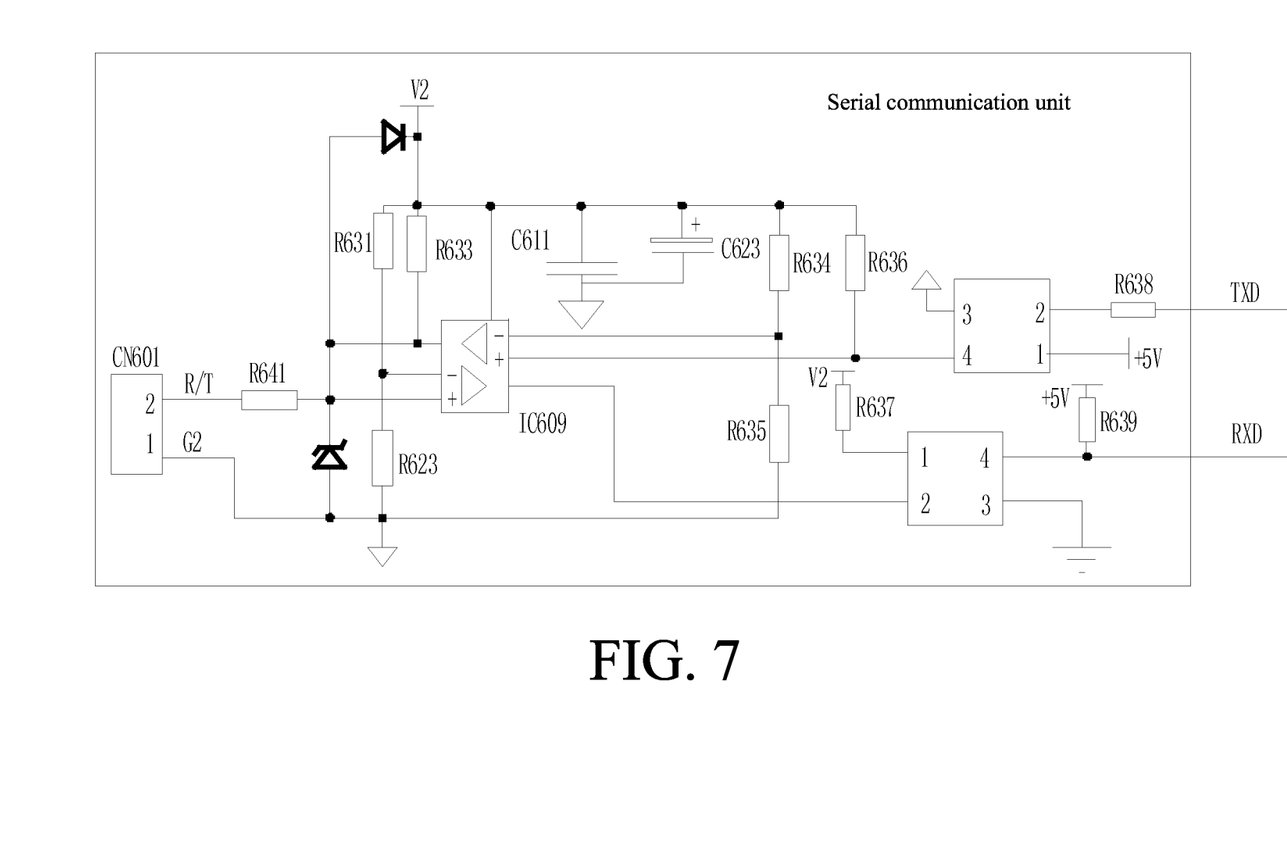
FIG. 7 is a circuit diagram of the serial communication circuit according to one embodiment of the disclosure.

As shown in FIG. 3 and FIG. 7, the microprocessor may be further connected with a serial communication unit, and the microprocessor may establish an external communication connection via the serial communication unit and form a serial communication port.

Figure 8:
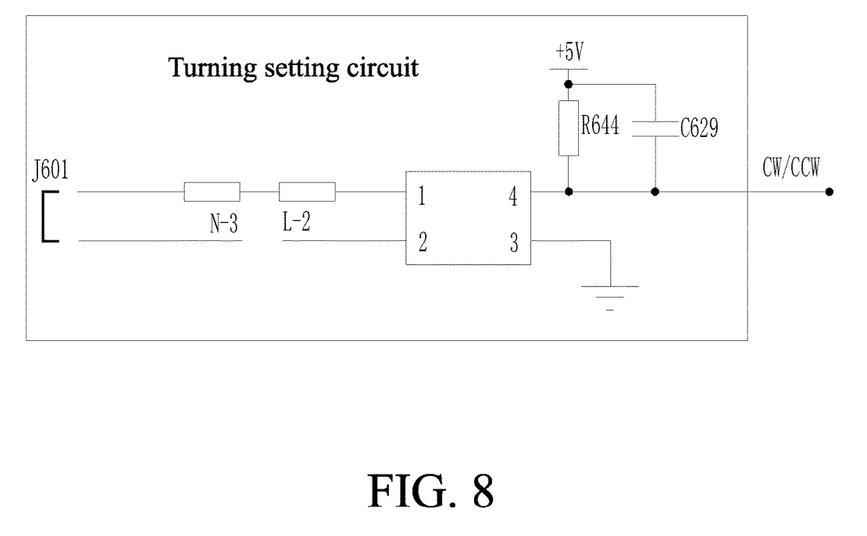
FIG. 8 is a circuit diagram of the turning setting circuit according to one embodiment of the disclosure.

As shown in FIG. 3 and FIG. 8, the microprocessor may be further connected with a turning setting circuit, and by connecting or breaking the turning setting circuit at the turn setting port with a connector J601, the turning setting circuit may send a control signal to the microprocessor, and the microprocessor may control the forward or backward rotation of the motor through the inverter circuit.

Figure 9:
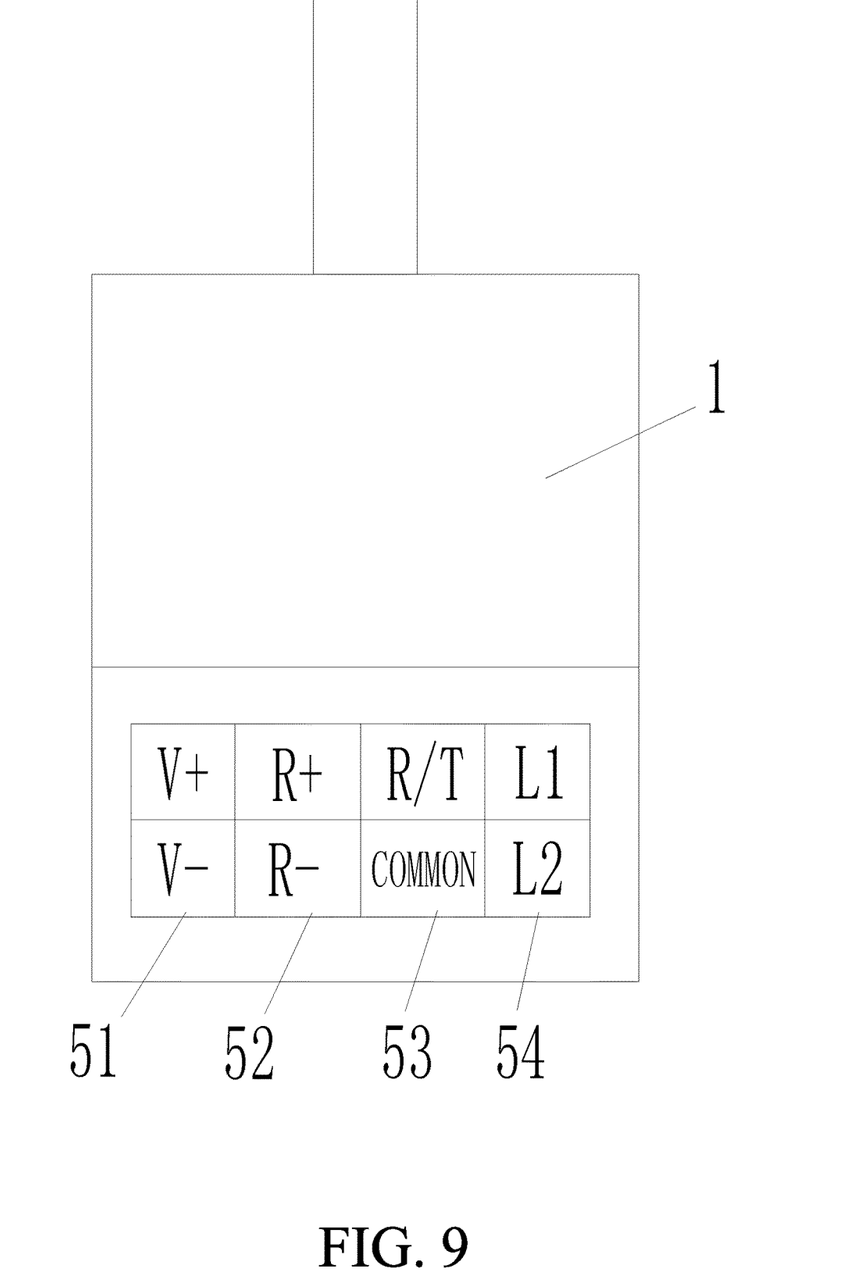
FIG. 9 illustrates the structure of the ECM motor according to one embodiment of the disclosure.

A wiring sheath 3 may be installed on the control box 21. A total of 9 wires 4, which may include the 5 tap input lines (N1, N2, N3, N4 and N5), the first AC input wire N, the ground wire E, the second AC input wire L and the common wire COM, may be guided out from the wiring sheath 3. A jumper wire box 5 may be installed on the wiring sheath 3. As shown in FIG. 9, a serial communication port 53, a power source setting port 51, a turn setting port 52, and a motor type selection port 54 may be installed in the jumper wire box 5. A connector may be installed at the serial communication port 53, the power source setting port 51, the turn setting port 52, and the motor type selection port 54, respectively. The serial communication port 53 may include R/T and COMMON, the power source setting port 51 may include ports V+ and V−, the turn setting port 52 may include ports R+ and R−, and the motor type selection port 54 may include ports L1 and L2. A connector may be installed at the power source setting port 51 to connect the ports V+ and V− such that the motor is in an operating state of two times of the voltage. A connector may be installed at the turn setting port 52 such that the motor runs by rotating forward or backward. The connector of the motor type selection port 54 may be electrically connected with the first jumper wire L1 and the second jumper wire L2, respectively, and the first jumper wire L1 and the second jumper wire L2 may be electrically connected or disconnected by installing or unplugging a connector at the motor type selection port 54. According to an embodiment, when a PSC motor used by a corresponding commercial equipment system is to be replaced, a connector may be installed at the motor type selection port 54 to electrically connect the port L1 and the port L2, and when an ECM motor used by a corresponding commercial equipment system is to be replaced, the connector at the motor type selection port 54 may be unplugged to disconnect the port L1 and the port L2. The output terminal of the tap detection circuit may be connected with the microprocessor via a filter circuit.

According to one embodiment, a principle of the present disclosure may be that when a PSC motor used by a corresponding commercial equipment system is to be replaced, embodiments disclosed herein may connect a total of 7 wires 4, which may include the 5 tap input lines (N1, N2, N3, N4 and N5), the first AC input wire N, and the ground wire E, to the equipment system. The first jumper wire L1 and the second jumper wire L2 may be shorted with a socket connector, and the second AC input wire L and the common wire COM may be suspended without connection. When an ECM motor used by a corresponding commercial equipment system is to be replaced, embodiments disclosed herein may connect a total of 9 wires, which may include the 5 tap input lines (N1, N2, N3, N4 and N5), the first AC input wire N, the ground wire E, the second AC input wire L and the common wire COM, to the equipment system. The first jumper wire L1 and the second jumper wire L2 may be disconnected, and the common wire COM may detect signals and may output the same to the equipment system. As a result, the ECM motor may have a simple structure, which can conveniently replace PSC motors and ECM motors on the market that use AC inputs as tap signals. The replacement may be simple, the wiring may be convenient, and the cost may be low. Moreover, the ECM motor disclosed herein may integrate a variety of circuits, may be applicable for different applications, may have high operational reliability, and may save time and cost of management and development. According to one embodiment, one unit may have multiple functions, which may lead to a high performance/price ratio.

Example 2

According to some embodiments, as shown in FIGS. 1-4 and FIG. 10, an HVAC system may include a THERMOSTAT and an HVAC system controller that originally controls a PSC motor. The THERMOSTAT may input control signals to the HVAC system controller, and the multi-function ECM motor may be used to directly replace the original PSC motor. The multi-function ECM motor may include a motor 1 and a motor controller 2. The motor controller 2 may include a control box 21 and a control circuit board 22 installed in the control box 21. The control circuit board 22 may be integrated with a microprocessor, an inverter circuit, a tap detection circuit and a power source portion. The power source portion may be connected to an external AC power source input, and the output terminal of the power source portion may supply power to all circuits. The tap detection circuit may be connected to 5 tap input lines (N1, N2, N3, N4 and N5), wherein only one tap input line may be selected to be in the on state, and the remaining lines may be selected to be in the off state without electricity. The tap detection circuit may further include a first AC input wire N, a second AC input wire L, a common wire COM, a ground wire E, a first jumper wire L1 and a second jumper wire L2. The tap detection circuit may include several current sensing units. Each tap input line may be connected to an input terminal of a current sensing unit. The first jumper wire L1 may be connected with the second AC input wire L, and the second jumper wire L2 may be connected with the common wire COM. The second input terminals of the current sensing units may be connected in parallel and then connected with the common wire COM and the second jumper wire L2, respectively. The output terminal of the current sensing unit may be connected to the input terminal of the microprocessor, and the microprocessor may select an operational parameter for the motor based on the detected on state signal of each tap input line and may control the motor to run according to the selected operational parameter.

Figure 10:
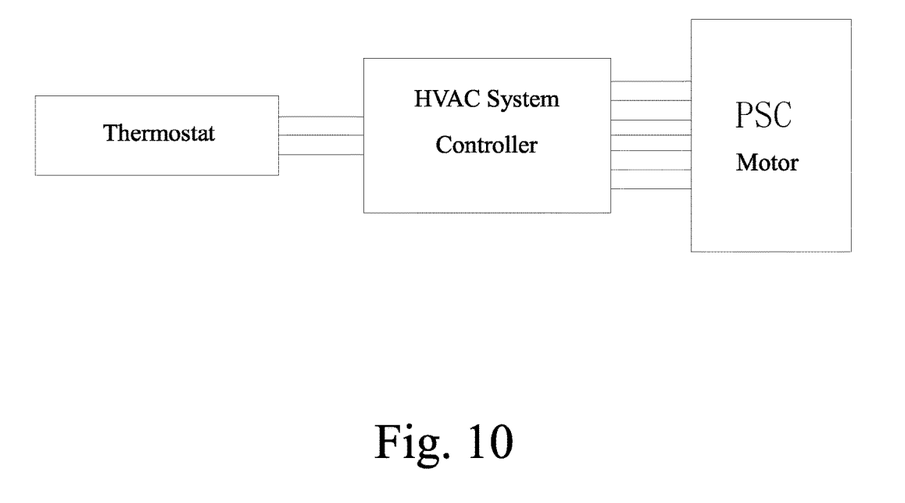
FIG. 10 is a block diagram of the circuit in Example 2 according to one embodiment of the disclosure.

A total of 7 wires, which may include the 5 tap input lines (N1, N2, N3, N4 and N5), the first AC input wire N, and the ground wire E, are connected to the HVAC system controller. The first jumper wire L1 and the second jumper wire L2 may be shorted with a socket connector. One of the 5 tap input lines (N1, N2, N3, N4 and N5) may be for a high-voltage AC to pass through, and one of the 5 tap input lines (N1, N2, N3, N4 and N5) and the first AC input wire N may act as the AC power input and may be connected in parallel into the power source portion. The second AC input wire L and the common wire COM may be suspended without connection. The microprocessor may be further connected with a serial communication unit, and the microprocessor may establish an external communication connection via the serial communication unit and form a serial communication port. The power source portion may include a voltage multiplication and conversion device, and by connecting or breaking the voltage multiplication and conversion device at the power source setting port with a connector, the voltage multiplication and conversion device may be in an operating state of one time or two times of the voltage. The microprocessor may be further connected with a turning setting circuit, and by connecting or breaking the turning setting circuit at the turn setting port with a connector, the turning setting circuit may send a control signal to the microprocessor. The microprocessor may control the forward or backward rotation of the motor through the inverter circuit.

In some embodiments, a wiring sheath 3 may be installed on the control box 21. A total of 9 wires 4, including the 5 tap input lines (N1, N2, N3, N4 and N5), the first AC input wire N, the ground wire E, the second AC input wire L and the common wire COM, may be guided out from the wiring sheath 3. A jumper wire box 5 may be installed on the wiring sheath 3, and a serial communication port, a power source setting port, a turn setting port, and a motor type selection port may be installed in the jumper wire box 5. A connector may be installed at the serial communication port, the power source setting port, the turn setting port, and the motor type selection port, respectively. The connector of the motor type selection port may be electrically connected with the first jumper wire L1 and the second jumper wire L2, respectively. The first jumper wire L1 and the second jumper wire L2 may be electrically connected or disconnected by installing or unplugging a connector at the motor type selection port.

According to some embodiments, the HVAC system may have a simple structure. In addition, the HVAC system may use the ECM motor disclosed herein to replace a PSC motor. The installation may be simple, the wiring may be convenient, the original HVAC system structure may not need to be changed, the retrofitting cost may be low, the application range may be wide, and the electric efficiency may be higher.

Example 3

As shown in FIGS. 1-4 and FIG. 11, an embodiment of this disclosure may be an HVAC system that includes a THERMOSTAT and an HVAC system controller that originally controls an ECM motor. The THERMOSTAT may input control signals to the HVAC system controller, and the multi-function ECM motor may be used to directly replace the original ECM motor. The multi-function ECM motor may include a motor 1 and a motor controller 2. The motor controller 2 may include a control box 21 and a control circuit board 22 installed in the control box 21. The control circuit board 22 may be integrated with a microprocessor, an inverter circuit, a tap detection circuit and a power source portion. The power source portion may be connected to an external AC power source input, and the output terminal of the power source portion may supply power to all circuits. In some embodiments, the tap detection circuit may be connected to 5 tap input lines (N1, N2, N3, N4 and N5), wherein only one tap input line may be selected to be in the on state, and the remaining lines may be selected to be in the off state without electricity. The tap detection circuit may further include a first AC input wire N, a second AC input wire L, a common wire COM, a ground wire E, a first jumper wire L1, and a second jumper wire L2. The tap detection circuit may include several current sensing units, and each tap input line may be connected to an input terminal of a current sensing unit. The first jumper wire L1 may be connected with the second AC input wire L, and the second jumper wire L2 may be connected with the common wire COM. The second input terminals of the current sensing unit may be connected in parallel and then connected with the common wire COM and the second jumper wire L2. The output terminal of the current sensing unit may be connected to the input terminal of the microprocessor, and the microprocessor may select an operational parameter for the motor based on the detected on state signal of each tap input line and may control the motor to run according to the selected operational parameter.

In some embodiments, a total of 9 wires, which may include the 5 tap input lines (N1, N2, N3, N4 and N5), the first AC input wire N, the ground wire E, the second AC input wire L and the common wire COM, may be connected to the HVAC system controller. The first jumper wire L1 and the second jumper wire L2 may be disconnected, and the first AC input wire N and the second AC input wire L may act as the external AC power input and may be connected in parallel into the power source portion. One of the 5 tap input lines (N1, N2, N3, N4 and N5) may be for a 24 V low-voltage AC to pass through, and the common wire COM may detect signals and may output the same to the HVAC system controller. The microprocessor may be further connected with a serial communication unit, and the microprocessor may establish an external communication connection via the serial communication unit and form a serial communication port. The power source portion may include a voltage multiplication and conversion device, and by connecting or breaking the voltage multiplication and conversion device at the power source setting port with a connector, the voltage multiplication and conversion device may be in an operating state of one time or two times of the voltage. The microprocessor may be further connected with a turning setting circuit, and by connecting or breaking the turning setting circuit at the turn setting port with a connector, the turning setting circuit may send a control signal to the microprocessor. The microprocessor may control the forward or backward rotation of the motor through the inverter circuit.

In some embodiments, a wiring sheath 3 may be installed on the control box 21. A total of 9 wires 4, including the 5 tap input lines (N1, N2, N3, N4 and N5), the first AC input wire N, the ground wire E, the second AC input wire L and the common wire COM, may be guided out from the wiring sheath 3. A jumper wire box 4 may be installed on the wiring sheath 3, and a serial communication port, a power source setting port, a turn setting port, and a motor type selection port may be installed in the jumper wire box 4. A connector may be installed at the serial communication port, the power source setting port, the turn setting port, and the motor type selection port, respectively, and the connector of the motor type selection port may be electrically connected with the first jumper wire L1 and the second jumper wire L2, respectively. The first jumper wire L1 and the second jumper wire L2 may be electrically connected or disconnected by installing or unplugging a connector at the motor type selection port.

In some embodiments, the HVAC system may have a simple structure. The HVAC system may use an embodiment of the ECM motor disclosed herein to replace an ECM motor that uses AC inputs as tap signals. The installation may be simple, the wiring may be convenient, the original HVAC system structure may not need to be changed, the retrofitting cost may be low, the application range may be wide, and the electric efficiency may be higher.

The examples above are preferred embodiments of the disclosure, but embodiments of the present disclosure are not limited thereby. Any other change, modification, substitution, combination, and simplification without departing from the spirit, essence and principle of the present utility model are equivalent substitutions and shall be encompassed by the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus configured to replace motors in Heating, Ventilation, and Air Conditioning (HVAC) systems, comprising: a first circuit configured to: couple to a system controller via a first plurality of input lines to configure the apparatus to replace a first type of motor and to configure the apparatus to replace a second type of motor, wherein each input line of the first plurality of input lines is coupled to one of a plurality of current sensing units of the first circuit; and couple to the system controller via a common input line to configure the apparatus to replace the second type of motor, wherein the common input line is coupled to each of the plurality of current sensing units; and a power circuit configured to: couple to the system controller via a second plurality of input lines to configure the apparatus to replace a first type of motor and to configure the apparatus to replace a second type of motor; and couple to the system controller via a power input line to configure the apparatus to replace the second type of motor; wherein the first type of motor is a permanent-spilt capacitor AC motor (PSC) and the second type of motor is an electronically commutated (ECM) motor.

2. The apparatus of claim 1, wherein the common input line and the power input line are shorted together when the apparatus is configured to replace the first type of motor.

3. The apparatus of claim 1, wherein, when the apparatus is configured to replace the first type of motor, the first circuit is configured to not couple to the system controller via the common input line and the power circuit is configured to not couple to the system controller via the power input line.

4. The apparatus of claim 1, wherein the first circuit comprises a tap detection circuit, each tap corresponding to a different motor operation mode, and wherein only one tap is in an on state at a time while the remainder of taps remain in an off state.

5. The apparatus of claim 1, wherein the first circuit is further configured to:
   receive a voltage signal from the system controller via at least one input line of the first plurality of input lines;
   detect via which input line of the plurality of input lines the voltage signal was received; and
   transmit, via an output port associated with the detected input line, a signal to a processor of the apparatus.

6. The apparatus of claim 5, wherein the processor is configured to:
   receive the signal transmitted from the output port associated with the detected input line;
   select one of a plurality of operation modes in which to operate the motor based, at least in part, on the received signal; and
   instruct the motor to operate in the selected operation mode.

7. A method for replacing motors in Heating, Ventilation, and Air Conditioning (HVAC) systems, comprising:
   coupling a first circuit to a system controller via a first plurality of input lines and a power circuit to the system controller via a second plurality of input lines to configure an apparatus to replace a first type of motor and to configure the apparatus to replace a second type of motor, wherein each input line of the first plurality of input lines is coupled to one of a plurality of current sensing units of the first circuit; and
   coupling the first circuit to the system controller via a common input line and a power circuit to the system controller via a power input line to configure the apparatus to replace the second type of motor, wherein the common input line is coupled to each of the plurality of current sensing units, wherein the first type of motor is a permanent-split capacitor AC motor (PSC) and the second type of motor is an electronically commutated (ECM) motor.

8. The method of claim 7, further comprising:
   receiving, with the first circuit, a voltage signal from the system controller via at least one input line of the first plurality of input lines;
   detecting, with the first circuit, via which input line of the plurality of input lines the voltage signal was received;
   selecting, with a processor, one of a plurality of operation modes in which to operate the motor based, at least in part, on the detected input line; and
   instructing, with the processor, the motor to operate in the selected operation mode.

9. The method of claim 7, wherein the common input line and the power input line are shorted together to further configure the apparatus to replace the first type of motor.

10. The method of claim 7, wherein, when the apparatus is configured to replace the first type of motor, the first circuit is not coupled to the system controller via the common input line and the power circuit is not coupled to the system controller via the power input line.

11. The method of claim 7, wherein the first circuit comprises a tap detection circuit, each tap corresponding to a different motor operation mode, and wherein only one tap is in an on state at a time while the remainder of taps remain in an off state.

* * * * *